US010713190B1

(12) United States Patent
Arbel

(10) Patent No.: US 10,713,190 B1
(45) Date of Patent: Jul. 14, 2020

(54) TRANSLATION LOOK-ASIDE BUFFER PREFETCH INITIATED BY BUS MASTER

(71) Applicant: Xilinx, Inc., San Jose, CA (US)

(72) Inventor: Ygal Arbel, Morgan Hill, CA (US)

(73) Assignee: Xilinx, Inc., San Jose, CA (US)

( * ) Notice: Subject to any disclaimer, the term of this patent is extended or adjusted under 35 U.S.C. 154(b) by 43 days.

(21) Appl. No.: 15/729,911

(22) Filed: Oct. 11, 2017

(51) Int. Cl.
*G06F 12/0862* (2016.01)
*G06F 3/06* (2006.01)
*G06F 13/16* (2006.01)

(52) U.S. Cl.
CPC ...... *G06F 13/1673* (2013.01); *G06F 12/0862* (2013.01); *G06F 2003/0691* (2013.01); *G06F 2212/6022* (2013.01)

(58) Field of Classification Search
CPC .......................... G06F 12/0862; G06F 12/1027
See application file for complete search history.

(56) References Cited

U.S. PATENT DOCUMENTS

| | | | |
|---|---|---|---|
| 6,327,175 B1 * | 12/2001 | Manapat | G11C 7/1018 365/154 |
| 2003/0145151 A1 * | 7/2003 | Matsushita | G11C 16/10 711/5 |
| 2013/0290619 A1 * | 10/2013 | Knight | G06F 3/061 711/104 |
| 2014/0108766 A1 * | 4/2014 | Desai | G06F 12/1027 711/205 |
| 2014/0281055 A1 * | 9/2014 | Davda | G06F 12/1081 710/26 |

OTHER PUBLICATIONS

U.S. Appl. No. 15/262,834, filed Sep. 12, 2016, Azad, Sarosh I., et al., entitled Memory Mangagement Unit with Prefetch, Xilinx, Inc., San Jose, CA USA.

* cited by examiner

*Primary Examiner* — Sanjiv Shah
*Assistant Examiner* — Leandro R Villanueva
(74) *Attorney, Agent, or Firm* — Crawford Maunu PLLC

(57) ABSTRACT

Disclosed approaches for managing a translation look-aside buffer (TLB) have a bus master circuit that issues a read request that specifies a first virtual address of a first page. In response to a sequential access being identified and before data of the first page is returned, the bus master circuit issues a dummy read request that specifies a second virtual address of a second page. A TLB has mappings of virtual addresses to physical addresses, and a translation logic circuit translates virtual addresses to physical addresses. The translation logic circuit signals a miss in response to absence of a virtual address in the TLB. A control circuit in the MMU determines from a page table a mapping of a virtual address to a physical address in response to the signaled miss. The translation logic circuit updates the TLB circuit with the mapping.

17 Claims, 6 Drawing Sheets

US 10,713,190 B1

TRANSLATION LOOK-ASIDE BUFFER PREFETCH INITIATED BY BUS MASTER

TECHNICAL FIELD

The disclosure generally relates to populating a translation lookaside buffer with address mappings.

BACKGROUND

There are a variety of different applications that can use memory circuits including, but not limited to, programmable integrated circuits, programmable logic devices (PLDs), and System on Chip (SoC) devices. Some SoC devices can include programmable logic that is similar to programmable logic provided by various PLDs. PLDs are a type of programmable integrated circuit (IC) that can be programmed to perform specified logic functions. One type of PLD, the field programmable gate array (FPGA), can include an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay locked loops (DLLs), bus or network interfaces such as Peripheral Component Interconnect (PCI), PCI Express (PCIe) and Ethernet, and so forth. Some devices include enough components and functionality to effectively serve as an entire computer system on a single IC chip. Devices with such functionality are sometimes referred to as SoCs.

SoCs are one type of application in which multiple masters may share a common physical memory and I/O. One way in which the masters can share memory is through the use of virtual memory. Each master can operate within its own virtual address space that is mapped to the physical address space. A memory management unit (MMU) circuit can be configured to translate virtual addresses into physical addresses. The translation can be a significant bottleneck to efficiency.

SUMMARY

A disclosed circuit arrangement includes a bus master circuit and a memory management unit (MMU) coupled to the bus master circuit. The bus master circuit is configured to issue a first read request that specifies a first virtual address of a first page. The bus master circuit issues, in response to a sequential access being identified and before data of the first page is returned to the bus master circuit, a dummy read request that specifies a second virtual address of a second page. The MMU includes a translation look-aside buffer (TLB) circuit having a plurality of mappings of virtual addresses to physical addresses and a translation logic circuit configured to translate virtual addresses in requests from the bus master circuit to physical addresses using the TLB circuit. The translation logic circuit signals a TLB miss in response to absence of a virtual address in the TLB. The MMU further includes a control circuit coupled to the translation logic circuit. The control circuit is configured to determine from a page table a mapping of a virtual address to a physical address in response to the signaled TLB miss. The translation logic circuit is further configured to update the TLB circuit with the mapping of the virtual address to the physical address.

A disclosed method includes issuing by a bus master circuit, a first read request that specifies a first virtual address of a first page. In response to a sequential access being identified and before data of the first page is returned to the bus master circuit, the bus master circuit issues a dummy read request that specifies a second virtual address of a second page. A translation logic circuit in a memory management unit (MMU) circuit translates virtual addresses in requests from the bus master circuit to physical addresses using a translation look-aside buffer (TLB) circuit having a plurality of mappings of virtual addresses to physical addresses. A TLB miss is signaled in response to absence of a virtual address in the TLB. A control circuit determines from a page table, a mapping of a virtual address to a physical address in response to the signaled TLB miss. The translation logic circuit updates the TLB circuit with the mapping of the virtual address to the physical address.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

Figure 1:
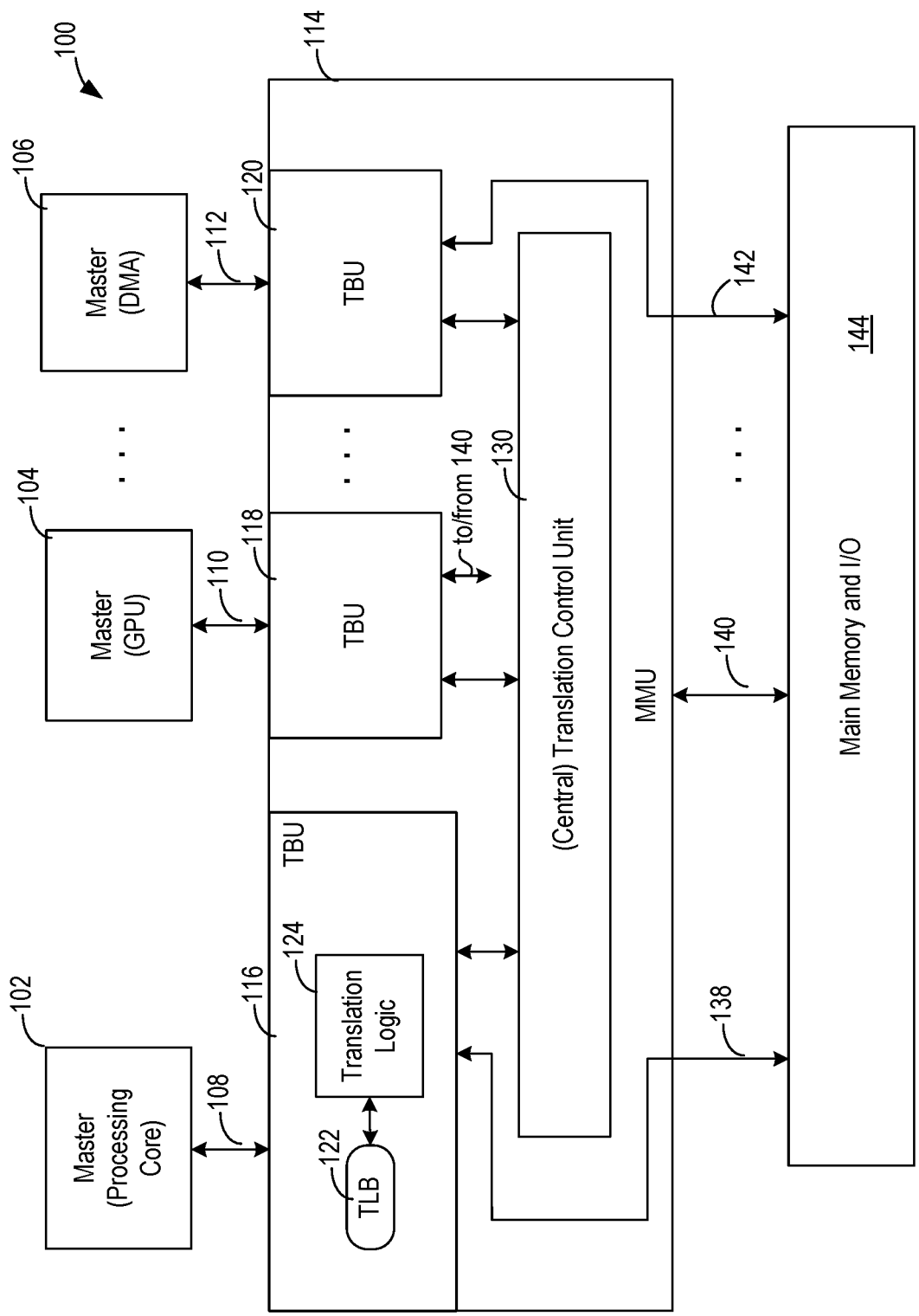
FIG. 1 depicts a block diagram of a system for generating address translation prefetch requests for a multiple port MMU.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Address translations between virtual and physical (main) memory spaces are performed by an MMU that accesses a page table that is stored in the main memory. The address space of the main memory can be divided into multiple portions of equal size. Such portions can be equivalently referred to as "pages," "blocks," or "segments". For example, a page size can be 4 KB in a 1 MB memory. The page table can store base addresses of the pages of the memory rather than storing every address of the memory. This process is sometimes referred to as a page table walk. The page table walk can require multiple accesses to the page table, which is stored in physical/main memory, in order to compute the physical address. The obtained physical address is then used as part of yet another main memory access that retrieves the data corresponding to the original virtual memory access request. Thus, a virtual memory access can result in many accesses to the main memory, and therefore be many times slower than a single, direct access to the main memory. To speed the translation process, a local cache circuit can store recent or frequent page translations so that the page table walk (and corresponding main memory accesses) can be avoided. This type of cache circuit is sometimes referred to as a Translation Look-aside Buffer (TLB). The MMU can first check the TLB contents to find a match for a virtual memory access. If the cache contains a matching entry (a TLB "hit"), the appropriate physical address information is used to compute the physical address. The MMU can then issue a main memory access request using the physical address. If the cache does not contain a matching entry (a TLB "miss"), the MMU can access the page table to retrieve the desired physical address, resulting in the aforementioned page walk delays.

The latency associated with page walk delays may be unacceptable for some applications. For example, some applications require a fixed bandwidth and a guaranteed maximum latency for proper operation. In the event of a page miss in the TLB, the latency incurred by page walking might violate the bandwidth and maximum latency requirements. Applications having an isochronous data flow, such as video and audio applications, have strict bandwidth and latency requirements that may be difficult to satisfy in some architectures due to page walking latency. For an exemplary page size of 4 KB and a transaction size of 256 bytes, one translation would be performed for every 16 transactions.

Various implementations are directed toward improving virtual memory address translation by way of the master circuit issuing dummy read requests to populate the TLB. For virtual address access patterns that are sequential, when the master circuit issues a read request ("first read request") for a virtual address at a page boundary, the master circuit immediately generates a dummy read request for the virtual address at the next page boundary. The dummy read request differs from the first read request in that the master circuit saves the data returned in response to the first read request and discards the data returned in response to the dummy read request. The dummy read request is issued for the purposes of populating the TLB with the mapping of the virtual address to the physical address so that the TLB mapping is available by the time master circuit needs to access the next page.

Turning now to the figures, FIG. 1 depicts a block diagram of a system for generating address translation prefetch requests for a multiple port MMU. The depicted components of the system reside on an IC chip 100, which includes multiple bus master circuits 102, 104, and 106 that generate virtual memory access requests for a corresponding input port 108, 110, and 112, and a corresponding output port 138, 140, and 142. The masters include one or more processing circuits, where each processing circuit provides one or more functions for the system. A few non-limiting examples of such circuits include central processing units (CPU) s or processing cores 102, graphics processing units (GPUs) 104, and circuits implemented in programmable logic of a field programmable gate array (FPGA) and configured to operate using direct memory access (DMA) 106.

A multiport MMU 114 is configured to receive virtual memory access requests from the masters on corresponding ports. The ports have different, corresponding translation buffer units (TBUs) 116, 118, and 120, where each TBU corresponds to a different virtual memory space of the associated master. TCU 130 controls and manages the TBUs and their respective TLB circuits 122, including implementing a page walk for main memory 144 when there is a TLB miss.

The TBUs 116, 118 and 120 include translation logic circuits 124 that are configured to handle virtual memory access requests. Handling memory access requests includes checking the TLB to determine whether or not the physical memory address is cached. In response to a TLB hit, the TBUs can generate a physical memory access request. In response to a TLB miss, the TBUs can generate a TLB miss indication in the form of a page walk request that is sent to the TCU 130. The original requests (after translation) proceed from the TBU directly to main memory 144.

Some systems utilize off-the-shelf technology for some components. For example, the MMU 114 could be an MMU based on design files that cannot be modified by the system designer. Thus, modifying the MMU for customized prefetching of TLB entries may not be an option. The disclosed approaches avoid the need to modify the MMU by instead configuring a bus master circuit to pre-populate the TLB according to the processing needs of the bus master. One or more of the bus master circuits 102, 104, . . . , 106 can include circuitry and/or programmed instructions that cause the master circuit to issue a read request followed immediately by a dummy request for selected data sets. For example, a user can program a configuration register to indicate that the data set to be processed by the bus master circuit is sequentially accessed. That is, the bus master circuit will process data at the first address of page N+1 after processing the data at the last address of page N. When the bus master circuit issues a read request that references the first virtual address of a page, in response to the state of the configuration register indicating sequential access, the bus master circuit immediately issues a dummy read request that specifies the first virtual address of the next page. By issuing the dummy read request immediately, and before the data of the previous page is returned, the TLB will be populated with the mapping of the virtual-to-physical address mapping of the next page by the time the bus master circuit requests access to the data of the next page.

Figure 2:
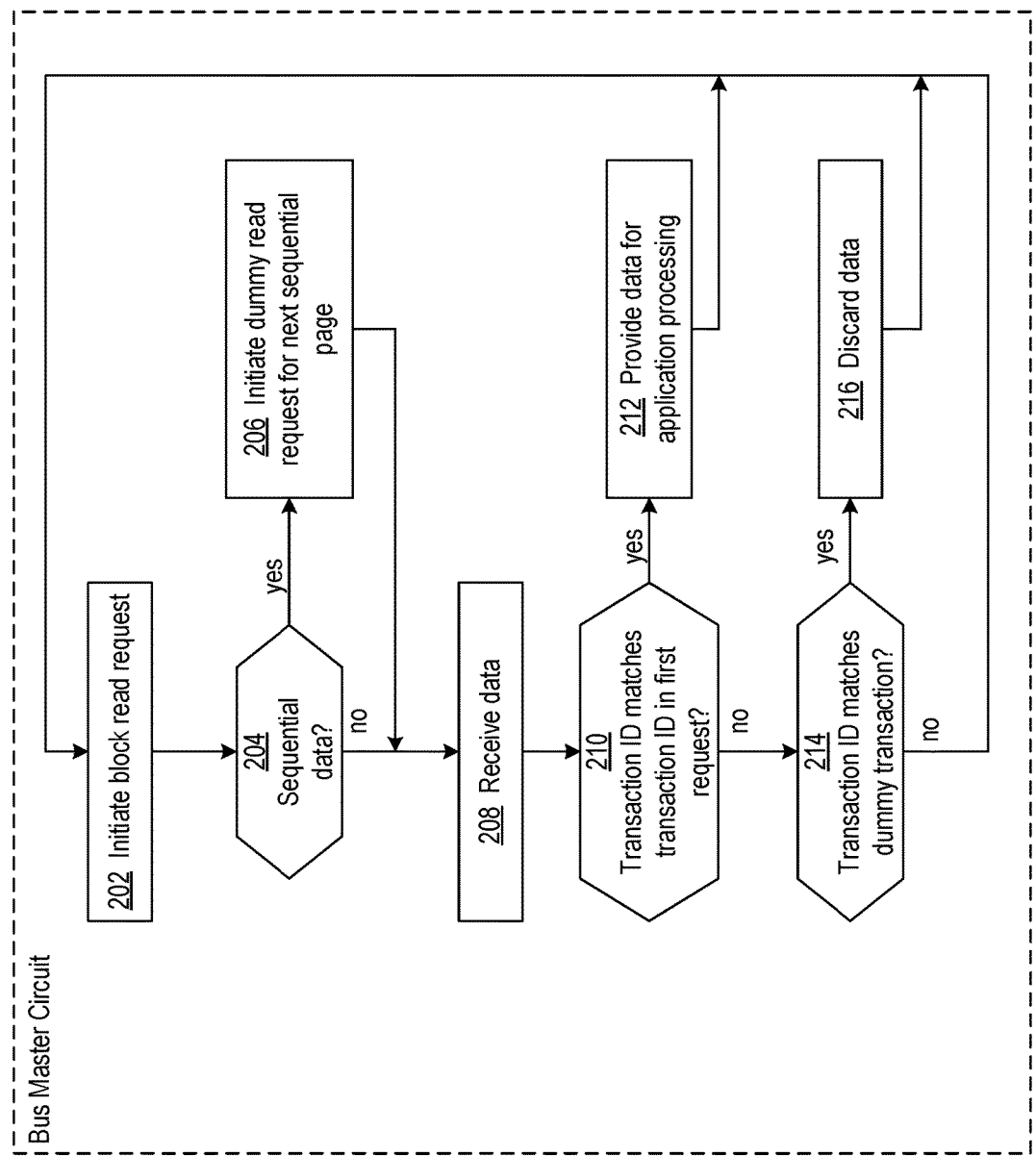
FIG. 2 shows a flowchart of a process performed by a bus master circuit in pre-populating a TLB when sequentially accessing virtual address space.

FIG. 2 shows a flowchart of a process performed by a bus master circuit in pre-populating a TLB when sequentially accessing virtual address space. At block 202, the bus master circuit issues a read request to the MMU. The issuing of the read request can be in response to an application processing sequential data, such as video or audio data. At decision block 204, in response to and immediately after issuing the first request, the bus master circuit determines whether or not data is being sequentially accessed. As indicated above, sequential access can be indicated by the state of a user-programmable configuration register.

In response to the state of the configuration register indicating sequential access, at block 206 the bus master circuit issues a dummy read request. If sequential access is not specified, the process continues at block 208. The dummy read request references the first virtual address of the next page and is issued immediately after the first read request of the current page. That is, the bus master circuit does not wait for a response to the first read request from the MMU before issuing the dummy read request. The bus master circuit issues the dummy read request for the purpose of populating the TLB with the virtual-to-physical address mapping of the address specified by the dummy read request before the bus master circuit is ready to process the data at the virtual address referenced in the dummy read request. By issuing the dummy read request immediately, and before the data of the previous page is returned, page walk latency is avoided by populating the TLB with the mapping of the virtual-to-physical address mapping of the next page by the time the bus master circuit requests access to the data of the next page. When the bus master circuit eventually requires access to the data at the virtual address in the dummy read request, the bus master circuit will issue another read request with the same virtual address as in the dummy read request, and then immediately issues another dummy read request for the next page. In an exemplary implementation, the dummy read request references only a small quantity of data in order to minimize use of the memory bus resources by the MMU in processing the dummy read request. For example, the dummy read request can be a "single-beat" read request which references a quantity of data that is equal to a number of bits of a data bus of the memory circuit coupled to the MMU circuit.

In order to distinguish dummy read requests from other read requests, the bus master circuit specifies a unique transaction identifier in each dummy read request. At block 208, the bus master circuit receives data in a response to a read request. The bus master circuit determines at decision block 210 whether the transaction identifier in the response matches the first read request. If so, the bus master circuit makes the requested data available for application processing, such as by storing the data in local buffers, at block 212. At decision block 214, the bus master circuit determines whether or not the transaction identifier matches that of the dummy read request. For a response to a dummy read request, the bus master circuit discards the data at block 216. That is, the data is not stored for subsequent use by the master circuit. When the data is needed by the bus master circuit, the bus master circuit issues another read request for the data at the virtual address that was specified in the dummy read request.

As an additional optimization, to prevent dummy prefetch requests from consuming bandwidth of the downstream network and main memory 144, a filter circuit can be connected at the egress side of the TBU. The filter circuit can identify dummy prefetch requests by the unique transaction identifiers and terminate the dummy prefetch requests. The dummy prefetch requests are not forwarded to downstream network and memory circuitry. The filter circuit can issue a one-beat response to the requesting bus master circuit, and the response can have data=0 and a status=OK. The filter circuit permits requests that are not dummy prefetch requests to pass unimpeded. As will be recognized from the forgoing description, even though the dummy prefetch request is discarded and not passed downstream, the TLB is still populated with address translations for the dummy request.

Figure 3:
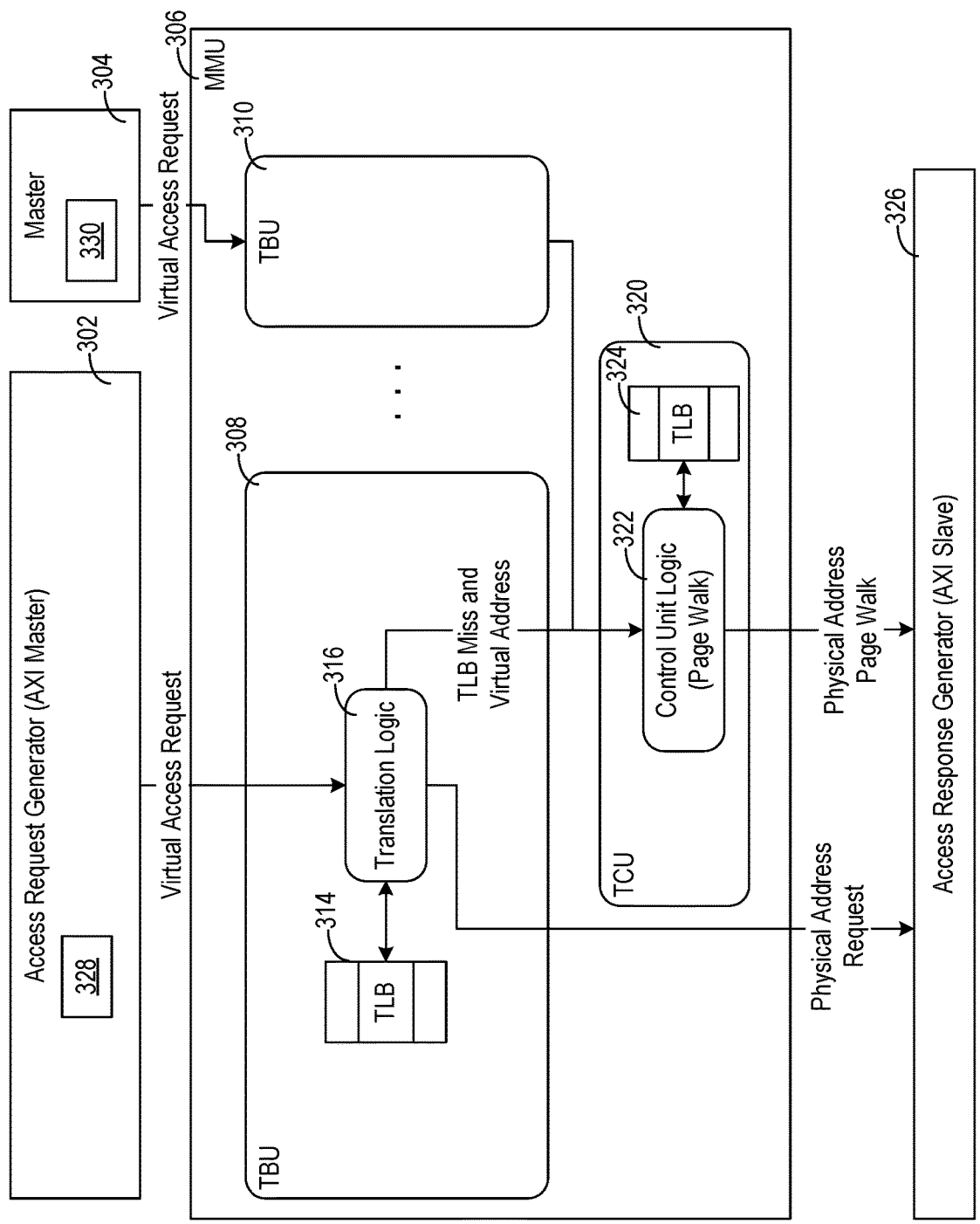
FIG. 3 is a block diagram that shows particular aspects of an MMU.

FIG. 3 is a block diagram that shows particular aspects of an MMU, consistent with implementations of the present disclosure. FIG. 3 shows an MMU 306 with multiple TBUs 308 and 310. Although not limited thereto, the description of the various components of FIG. 3 is generally consistent with similar components discussed in FIG. 1 and elsewhere in the present disclosure. A bus master circuit operating as an access request generator 302, operates in a virtual memory space that is mapped to a physical memory space provided by the access response generator 326. In certain embodiments, the system of FIG. 3 is part of an SoC that uses a master-slave interconnection solution, such as AMBA (Advanced Microcontroller Bus Architecture) eXtensible Interface (AXI) interconnection/bus. Other interconnection and bus solutions are also possible.

Translation logic circuit 316 can be configured to receive virtual memory access requests from the access request generator 302 and determine whether the requests are TLB hits or misses based upon the contents of the TLB 314. In the case of a TLB hit, the translation logic 316 can generate a physical address request that is sent to an access response generator 326, which can be one of several slave devices mapped to the physical memory space.

Translation Control Unit (TCU) 320 can respond to a TLB miss and a received virtual address by performing a page walk in control unit logic 322 to retrieve the corresponding physical address from the main memory. Upon finding the appropriate physical address, TCU 320 can provide the physical address to the requesting TBU for storage in the corresponding TLB. In some embodiments, TCU 320 can also include a TLB 324, which is thereby shared between the multiple TBUs. When a TBU receives a physical address from the TCU 320, the TLB 314 can be updated and the translation logic 316 can generate a physical memory access to complete the access request.

Consistent with various implementations, the bus master circuits 302 and 304 can send requests directly to the TBUs 308 and 310 that specify dummy read requests for prepopulating the TLBs 314. Each of the masters 302 and 304 can include a respective user-configurable control register 328 and 330 for controlling whether or not the master issues dummy read requests as described above. In another implementation, the control registers 328 and 330 can store ranges of virtual addresses. Each master can be configured with executable instructions or control circuitry that determines whether or not the virtual address in a read request is within the specified range of virtual addresses. In response to the virtual address being within the specified range, the master issues a dummy read request as described above.

Figure 4:
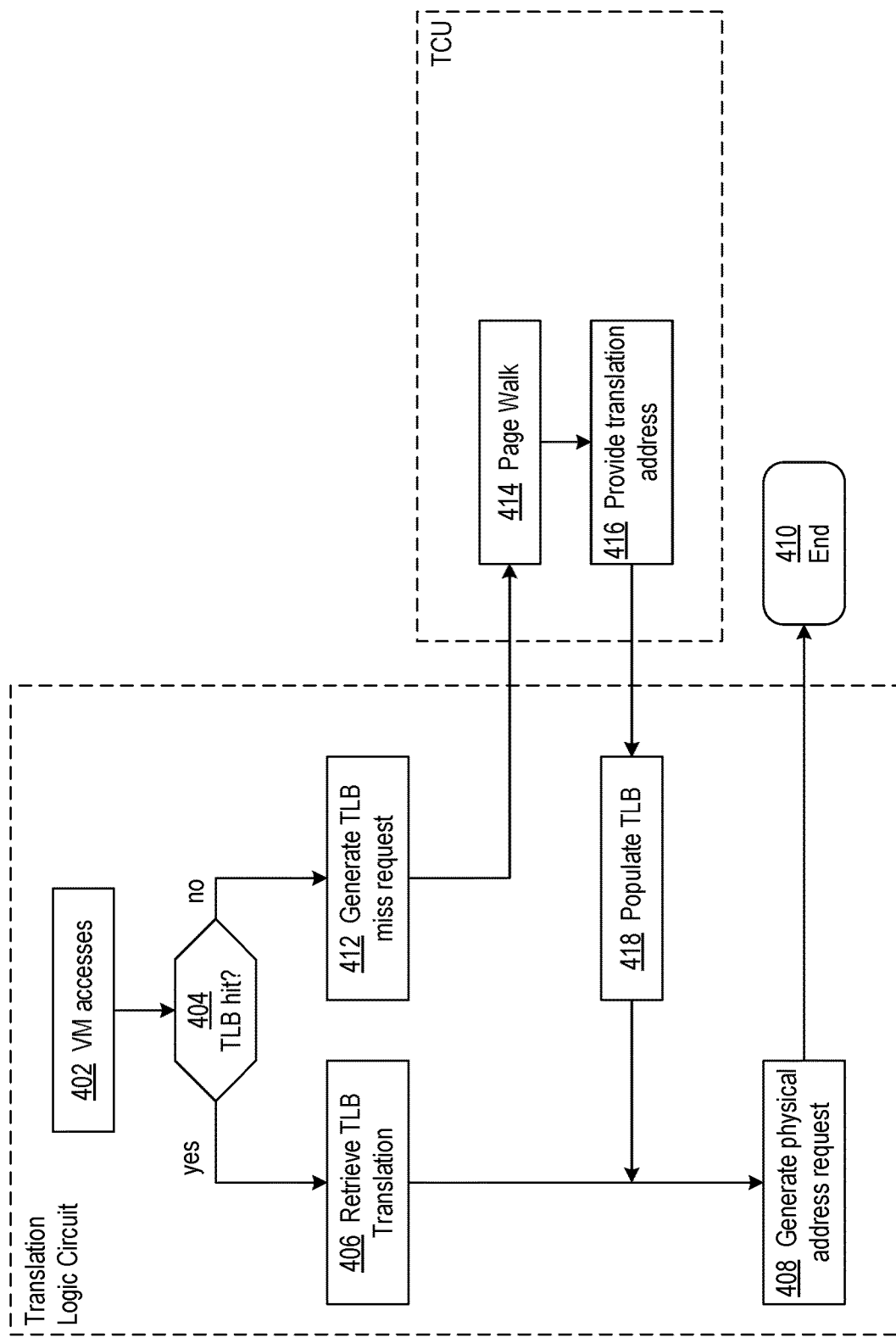
FIG. 4 is a flow diagram of an exemplary process performed by a translation logic circuit of an MMU.

FIG. 4 is a flow diagram of an exemplary process performed by a translation logic circuit of an MMU. A translation logic circuit receives virtual memory (VM) access requests on a corresponding port of an MMU, per block 402. The translation logic circuit then checks the TLB contents to determine whether or not the translation information is cached for the received VM access request, per block 404. If there is a TLB hit, the translation logic circuit retrieves the TLB translation data from the TLB and uses the data to generate a physical memory address request, per blocks 406 and 408, respectively. The memory transaction can then complete at block 410 when the corresponding slave device responds to the access request.

If there is a TLB miss, the translation logic circuit can generate a TLB miss request that is then provided to the TCU, per block 412. The TCU can initiate a page walk to retrieve the physical memory address that corresponds to the VM access request, per block 414. The results of the page walk are then provided to the translation logic circuit, per block 416. The translation logic circuit uses the results to populate the TLB, per block 418. In some embodiments, the TCU can have a separate TLB that can also be populated using the results of the page walk. The translation logic circuit can generate a physical address request so that the VM access request from the master can be completed, per block 408.

Figure 5:
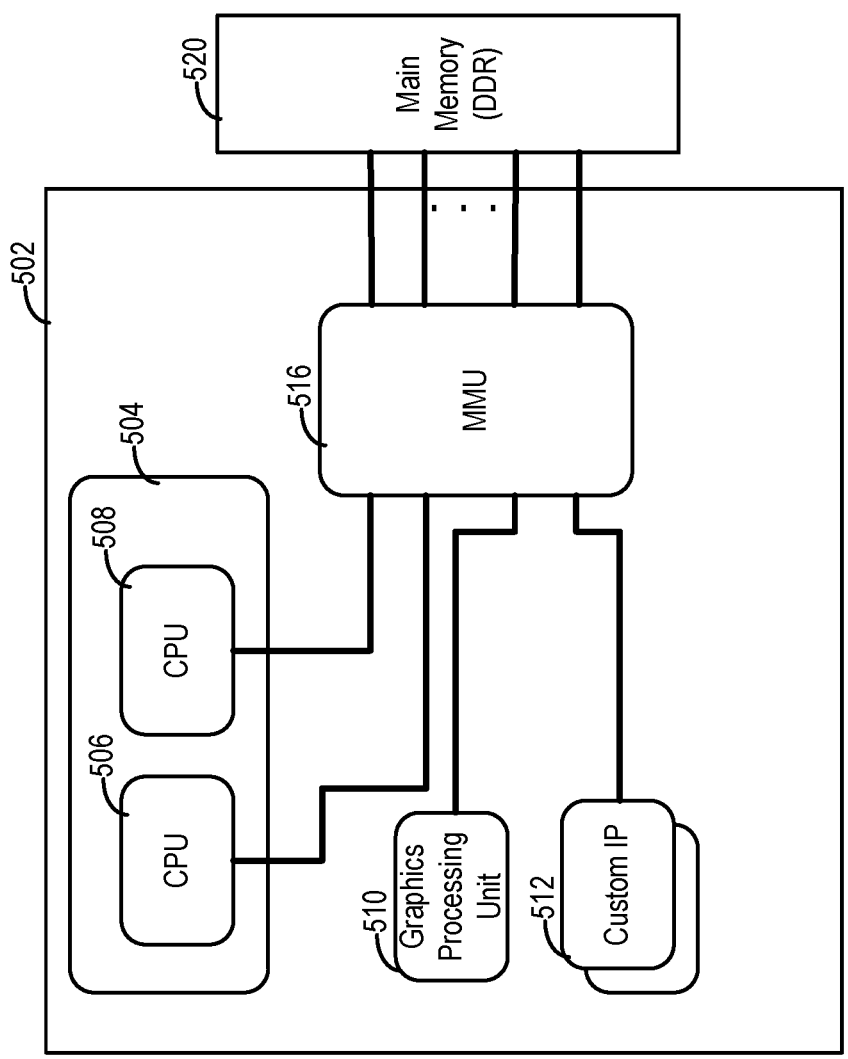
FIG. 5 shows an example of an integrated circuit chip that is configured to use address translation prefetch requests.

FIG. 5 shows an example of an integrated circuit (IC) chip that is configured to use address translation prefetch requests. The IC chip 502 includes multiple sources of virtual memory access requests (also referred to as masters in some interconnection solutions). The depicted examples include a microcontroller circuit 504 with one or more CPUs 506 and 508, a GPU 510, and customizable intellectual property (IP) cores 512. A few other non-limiting examples of access request sources include DSPs and DMA circuits that might be linked to input/output circuits, IP cores, or other circuits.

Although the various implementations discussed herein are not necessarily limited thereto, the IC chip can be a programmable IC chip. For example, the programmable IC could be an SoC that includes programmable resources (e.g., logic blocks and interconnects). The programmable resources could be a field programmable gate array logic (FPGA) that includes several different types of programmable logic blocks in the array. Though a programmable IC is described, those skilled in the art will recognize that the disclosed methods and systems may be applied to circuit designs that target application specific integrated circuits (ASICs) and are not limited to programmable integrated circuits (ICs).

The depicted IC chip includes a MMU 516, which can be consistent with one or more of the implementations discussed herein. The MMU controls access to main memory 520, which is depicted as being off-chip. The main memory 520 can also be located on chip.

One or more of the depicted components can be implemented in programmable logic. The use of programmable logic can allow for more flexibility to the end user. For example, the prefetch translation logic circuits can be provided as part of a library of IP cores developed by the IC chip manufacturer. An end user can then decide whether to implement the IP cores for these circuits. Thus, the IP cores can be selectively added or removed from a design.

A programmable IC 502 can include a large number of different programmable tiles, which are not expressly depicted for sake of simplicity. A few examples of programmable tiles include multi-gigabit transceivers (MGTs), configurable logic blocks (CLBs), random access memory blocks (BRAMs), input/output blocks (IOBs), configuration and clocking logic (CONFIG/CLOCKS), digital signal processing blocks (DSPs), specialized input/output blocks (I/O), for example, clock ports, and other programmable logic such as digital clock managers, analog-to-digital converters, system monitoring logic, and so forth. FIG. 5 is intended to illustrate a non-limiting example of a (programmable) IC chip architecture.

For the various flow diagrams depicted herein, the particular orders of the blocks and associated functions are provided as examples. The ordering is not necessarily limiting and can be varied according to various implementations.

Figure 6:
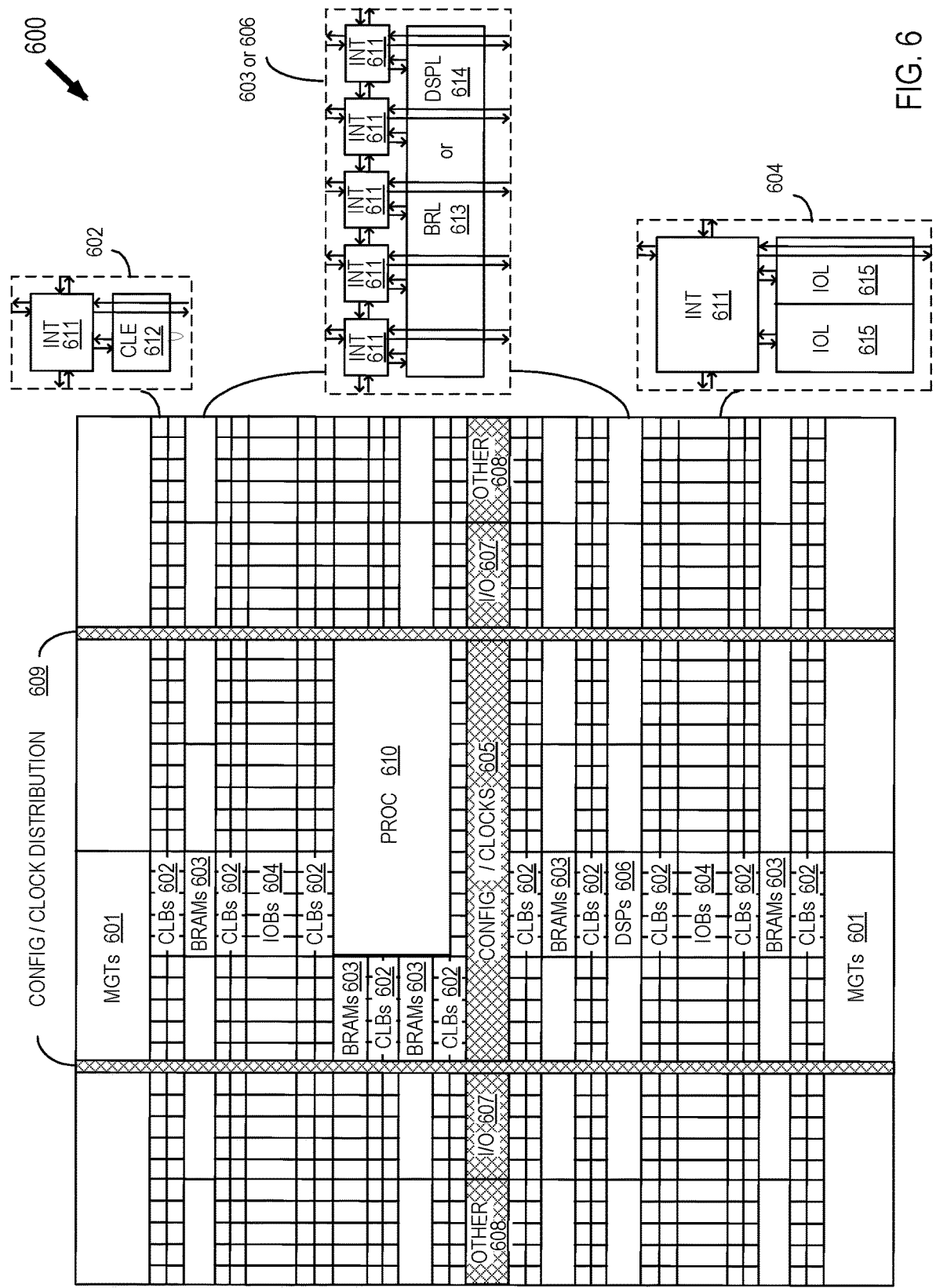
FIG. 6 shows a programmable integrated circuit on which the disclosed circuits and processes may be implemented.

FIG. 6 shows a programmable integrated circuit (IC) 600 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 6 illustrates programmable IC 600 that includes a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized input/output blocks (I/O) 607, for example, clock ports, and other programmable logic 608 such as digital clock managers, analog-to-digital converters, system monitoring logic, and so forth. Some programmable IC having FPGA logic also include dedicated processor blocks (PROC) 610 and internal and external reconfiguration ports (not shown).

In some FPGA logic, each programmable tile includes a programmable interconnect element (INT) 611 having standardized connections to and from a corresponding interconnect element in each adjacent tile. Therefore, the programmable interconnect elements taken together implement the programmable interconnect structure for the illustrated FPGA logic. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic, plus a single programmable interconnect element INT 611. A BRAM 603 can include a BRAM logic element (BRL) 613 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element (DSPL) 614 in addition to an appropriate number of programmable interconnect elements. An 10B 604 can include, for example, two instances of an input/output logic element (IOL) 615 in addition to one instance of the programmable interconnect element INT 611. As will be clear to those of skill in the art, the actual I/O bond pads connected, for example, to the I/O logic element 615, are manufactured using metal layered above the various illustrated logic blocks, and typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 6 include additional logic blocks that disrupt the regular columnar structure making up a large part of the programmable IC. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual programmable IC, more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures disclosed herein. In addition, the processes may be provided via a variety of computer-readable storage media or delivery channels such as magnetic or optical disks or tapes, electronic storage devices, or as application services over a network.

Though the circuitry has been described in terms of a single IC chip, it will be recognized that the disclosed circuits and methods could be implemented on various other configurations of IC dies. Such other configurations can include, without limitation, multiple masters disposed on multiple IC dies and having access to a shared memory on a separate chip, a multiple-chip module having multiple masters and a shared memory, or multiple masters on one chip and a shared memory on another chip.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for translating virtual addresses to physical addresses. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement comprising:
   a bus master circuit including a control register configured to store a value that controls a state of a sequential access signal, the bus master circuit configured to:
   issue a plurality of read requests that specify respective virtual addresses, including a first read request that specifies a first virtual address of a first page; and
   issue, in response to the state of the sequential access signal and before data of the first page is returned to the bus master circuit, a dummy read request of the plurality of read requests that specifies a second virtual address of a second page; and
   a memory management unit (MMU) circuit coupled to the bus master circuit and including:
   a translation look-aside buffer (TLB) circuit having a plurality of mappings of virtual addresses to physical addresses;
   a translation logic circuit configured to translate the respective virtual addresses to the physical addresses using the mappings of the TLB circuit and to signal a TLB miss in response to absence of a mapping of a virtual address of the respective virtual addresses to a physical address in the TLB;
   a first control circuit coupled to the translation logic circuit and configured to determine from a page table, a mapping of a virtual address of the respective virtual addresses, including the second virtual address, to a physical address in response to the signaled TLB miss; and
   wherein the translation logic circuit is further configured to update the TLB circuit with the mapping determined from the page table.

2. The circuit arrangement of claim 1, wherein the bus master circuit is further configured to:
   store data of the first page returned from the memory management unit in buffer circuitry of the bus master circuit; and
   discard the data of the second page returned from the memory management unit.

3. The circuit arrangement of claim 1, wherein:
   the first page includes a first plurality of words, and the second page includes a second plurality of words; and
   a virtual address of a first word of the second plurality of words of the second page successively follows a virtual address of a last word of the first plurality of words of the first page.

4. The circuit arrangement of claim 1, wherein a quantity of data requested in the dummy read request is equal to a number of bits of a data bus of a memory circuit coupled to the MMU circuit.

5. The circuit arrangement of claim 1, wherein the bus master circuit is further configured to:
   specify in the dummy read request a unique transaction identifier;
   store data of the first page returned from the memory management unit in buffer circuitry of the bus master circuit; and
   discard data of the second page returned from the memory management unit in response to the unique transaction identifier accompanying the data of the second page.

6. The circuit arrangement of claim 1, wherein the bus master circuit includes:
   user-configurable control registers for storage of values that indicate a virtual address range; and
   a second control circuit coupled to the user-configurable control registers and configured to generate the first value of the sequential access signal in response to the first virtual address being within the virtual address range.

7. The circuit arrangement of claim 1, wherein the bus master circuit is a logic circuit implemented in programmable logic of a field programmable gate array.

8. The circuit arrangement of claim 1, wherein the bus master circuit is a graphics processing unit.

9. The circuit arrangement of claim 1, wherein the bus master circuit is further configured to:
   store data of the first page returned from the memory management unit in buffer circuitry of the bus master circuit; and
   discard the data of the second page returned from the memory management unit; and
   wherein a quantity of data requested in the dummy read request is equal to a number of bits of a data bus of a memory circuit coupled to the MMU circuit.

10. A method comprising:
    controlling state of a sequential access signal using a user-configurable control register;
    issuing by a bus master circuit, a plurality of read requests that specify respective virtual addresses, including a first read request that specifies a first virtual address of a first page;
    issuing by the bus master circuit, in response to the state of the sequential access signal being equal to a first value and before data of the first page is returned to the bus master circuit, a dummy read request of the plurality of read requests that specifies a second virtual address of a second page;
    translating by a translation logic circuit in a memory management unit (MMU) circuit, the respective virtual addresses in the requests from the bus master circuit to physical addresses using a translation look-aside buffer (TLB) circuit having a plurality of mappings of virtual addresses to physical addresses;
    signaling a TLB miss in response to absence of a mapping of a virtual address of the respective virtual addresses to a physical address in the TLB;
    determining by a control circuit of the MMU from a page table, a mapping of a virtual address of the respective virtual addresses, including the second virtual address, to a physical address in response to the signaled TLB miss; and updating by the translation logic circuit, the TLB circuit with the mapping determined from the page table.

11. The method of claim 10, further comprising:

storing data of the first page returned from the memory management unit in buffer circuitry of the bus master circuit; and discarding the data of the second page returned from the memory management unit by the bus master circuit.

12. The method of claim 10, wherein:

the first page includes a first plurality of words, and the second page includes a second plurality of words; and a virtual address of a first word of the second plurality of words of the second page successively follows a virtual address of a last word of the first plurality of words of the first page.

13. The method of claim 10, wherein a quantity of data requested in the dummy read request is equal to a number of bits of a data bus of a memory circuit coupled to the MMU circuit.

14. The method of claim 10, further comprising:

specifying by the bus master circuit in the dummy read request a unique transaction identifier;

storing data of the first page returned from the memory management unit in buffer circuitry of the bus master circuit; and discard data of the second page returned from the memory management unit in response to the unique transaction identifier accompanying the data of the second page.

15. The method of claim 10, further comprising:

determining by the bus master circuit whether the first virtual address is within or outside a virtual address range indicated by addresses stored in user-configurable control registers; and generating the first value of the sequential access signal in response to the first virtual address being within a virtual address range indicated by addresses stored in the user-configurable control registers.

16. The method of claim 10, wherein the issuing of the first read request and the dummy read request is by the bus master circuit that is a logic circuit implemented in programmable logic of a field programmable gate array.

17. The method of claim 10, further comprising:

store data of the first page returned from the memory management unit in buffer circuitry of the bus master circuit; and discard the data of the second page returned from the memory management unit by the bus master circuit; and wherein a quantity of data requested in the dummy read request is equal to a number of bits of a data bus of a memory circuit coupled to the MMU circuit.

* * * * *